United States Patent [19]
McKay et al.

[11] Patent Number: 5,559,281
[45] Date of Patent: Sep. 24, 1996

[54] TEST CONNECTOR FOR ACCESSING COMPRESSED AIR AT TEST PORTS OF A RAILROAD BRAKE CONTROL VALVE

[75] Inventors: Albert A. McKay, Stoney Creek; Stanley J. Pasek, Brantford; David A. Porteous, Burlington; Jeffrey D. Reid, St. Catharines; Trevor A. Scott, Stoney Creek; Eric G. Smith, Burlington; Ulf Stahmer, Hamilton; W. Thomas Digweed, Beamsville, all of Canada

[73] Assignee: Westinghouse Air Brake Company, Wilmerding, Pa.

[21] Appl. No.: 427,358

[22] Filed: Apr. 25, 1995

[51] Int. Cl.⁶ ..................................................... B60T 17/22
[52] U.S. Cl. .................................................. 73/39; 73/121
[58] Field of Search ................................. 73/37, 39, 121

[56] References Cited

U.S. PATENT DOCUMENTS

| | | | |
|---|---|---|---|
| 1,143,620 | 6/1915 | Farmer | 73/39 |
| 2,032,121 | 2/1936 | Farmer | 73/39 |
| 2,103,305 | 12/1937 | Thomas | 73/39 |
| 3,596,500 | 8/1971 | Rees | 73/39 |
| 5,480,218 | 1/1996 | Hart et al. | 303/28 |
| 5,503,011 | 4/1996 | Hart et al. | 73/121 |

*Primary Examiner*—Hezron E. Williams
*Assistant Examiner*—Daniel S. Larkin
*Attorney, Agent, or Firm*—Gary J. Falce

[57] ABSTRACT

A test connector for connecting an air brake test device to access ports of an air brake control valve device where such access ports are normally closed by check valves. A plurality of actuator devices corresponding in number to the access ports are provided in the test connector to unseat the check valves and conduct test air to the test device via central passages in the actuators. The actuators are piston operated in response to a pilot pressure received from a source of compressed air remote from the connector.

11 Claims, 6 Drawing Sheets

5,559,281

1

TEST CONNECTOR FOR ACCESSING COMPRESSED AIR AT TEST PORTS OF A RAILROAD BRAKE CONTROL VALVE

BACKGROUND OF THE INVENTION

This invention relates to the automatic testing of railroad car brake equipment and particularly to means for directly accessing specific fluid pressure channels of brake control valve devices for use in conducting automatic testing of the car air brakes.

Historically, single car testing on "in-service" freight cars has been performed to provide a general check on the condition of the car brake equipment. A well-known single car test device is employed to enable this testing to be accomplished without removal of any of the brake components from the car. In general, the testing procedure is accomplished manually and entails a prescribed sequence of operation of different cocks, appropriate setting of a pressure regulator and monitoring of different pressure gages and timing devices comprising the single car test device.

Presently, an automatic single car test device is under development, which requires access to various pressure channels of the car control valve device.

Where standard pipe brackets having service and emergency valve portions mounted on opposing faces thereof are employed, such access is provided by a special adapter plate that is interposed between the pipe bracket and one of the opposed valve portions. The adapter plate is provided with access ports via which test ports associated with various fluid pressure channels may accessed.

In the case of the more recently developed single-sided pipe bracket on which the service and emergency valve portions are mounted on the same side thereof, test ports are provided on this single valve mounting face generally intermediate the respective valve portions. An access housing having access ports communicated with the test ports facilitates access to the test ports.

In both the standard pipe bracket as well as the newly developed pipe bracket, spring loaded check valves are provided to maintain the access ports closed under normal operating conditions.

SUMMARY OF THE INVENTION

The object of the present invention is to provide a test connector for accessing test air from a device to be tested and conveying such test air to a test device remote from the device to be tested.

It is an extension of this objective to provide a test connector that can be hooked up without also accessing test air from the access ports during such hookup in order to prevent any inadvertent escape of air during such installation.

It is a further extension of the foregoing objective to pilot operate the test connector actuators from a location remote from the point of hookup.

In accordance with the present invention, these objectives are accomplished by providing a test connector having a plurality of actuators corresponding in number to the test ports of a control valve device for a railroad car to be tested for proper brake operation. The test ports are normally closed by check valves which the actuators open in response to pilot pressure being connected to a piston of each actuator. In the actuated condition, the open check valves conduct test pressure to a test device via channels in the test connector in which the actuators are operatively disposed.

BRIEF DESCRIPTION OF THE DRAWINGS

These and other objects and advantages of the present invention will become apparent from the following detailed explanation when taken in conjunction with the accompanying drawings in which.

DESCRIPTION AND OPERATION

The present invention will be explained in conjunction with an AB type freight brake control valve device 10 that employs a new style, single-faced pipe bracket 12, it being understood that the present invention is also applicable to control valve devices employing the industry standard old style pipe bracket having opposing mounting faces to which the service and emergency valve portions are affixed.

Figure 1:
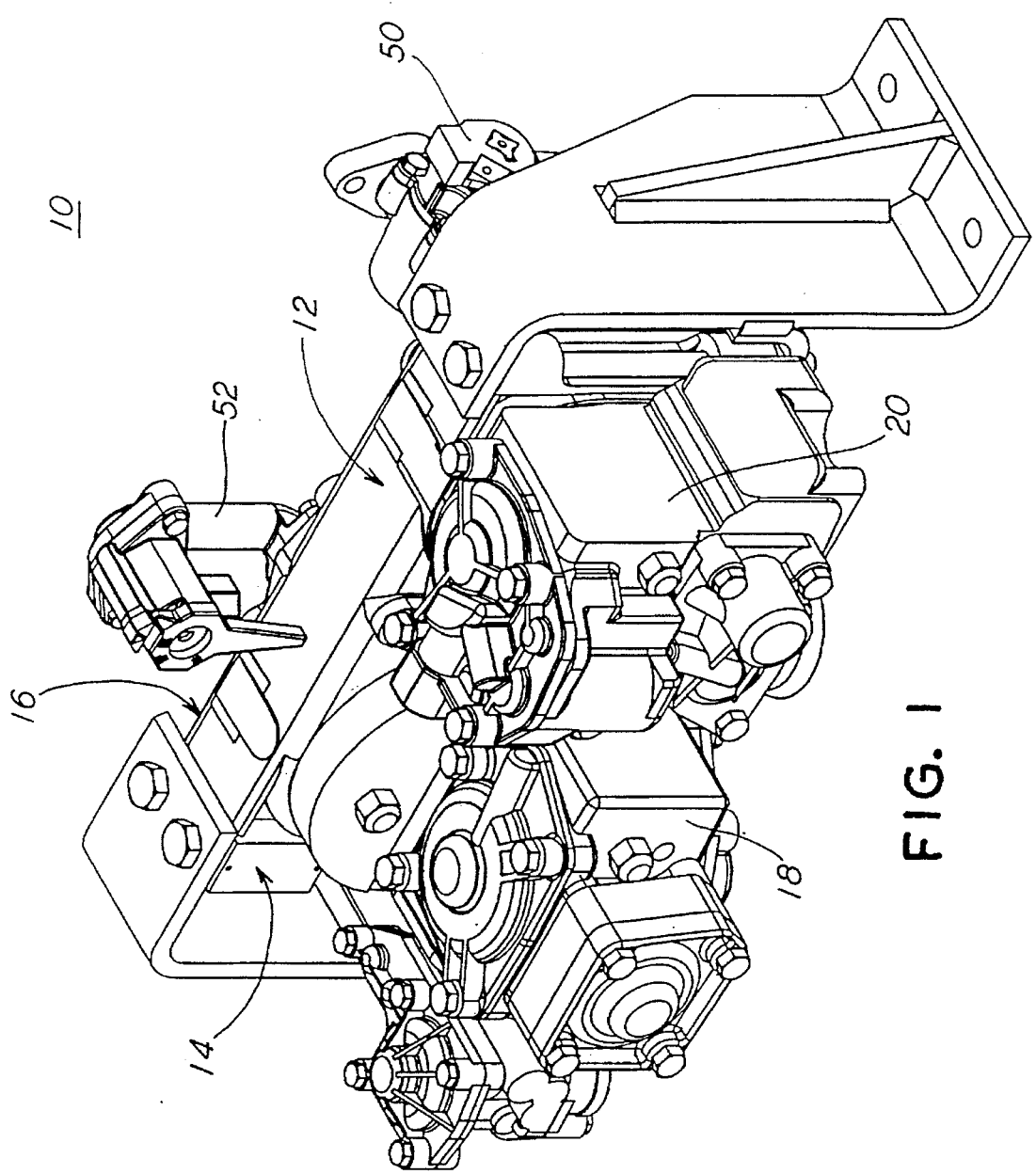
FIG. 1 is an axonometric view of a brake control valve device for railroad freight cars including a newly developed pipe bracket portion having a single valve mounting face to which the typical service and emergency valve portions are connected.

As shown in FIG. 1, the single-faced pipe bracket portion 12 includes a front side 14 and a back side 16, the front side 14 having mounted thereto a service portion 18 and emergency portion 20. Both the service and emergency portions, 18, 20, as shown, are mounted by any suitable means such as by using threaded bolts or studs. The service portion 18 and emergency portion 20 are mounted upon opposite ends of front face 14. The service portion 18 and emergency portion 20 are spaced apart a selected amount such that an area or space is provided between the service portion 18 and the emergency portion 20 on the front face 14 of pipe bracket portion 12.

A brake pipe connection (not shown) connects a brake pipe to the pipe bracket portion 12 and is provided at the back side 16 of the pipe bracket portion 12. A brake cylinder, an emergency reservoir and an auxiliary reservoir (each not shown) are also connected to the back side 16 of the pipe bracket portion 12, by any suitable means, such as by pipes and flanged fittings. A brake cylinder retainer valve 52 and a dirt collector 50 are also connected to the pipe bracket portion back side 16.

Figure 2:
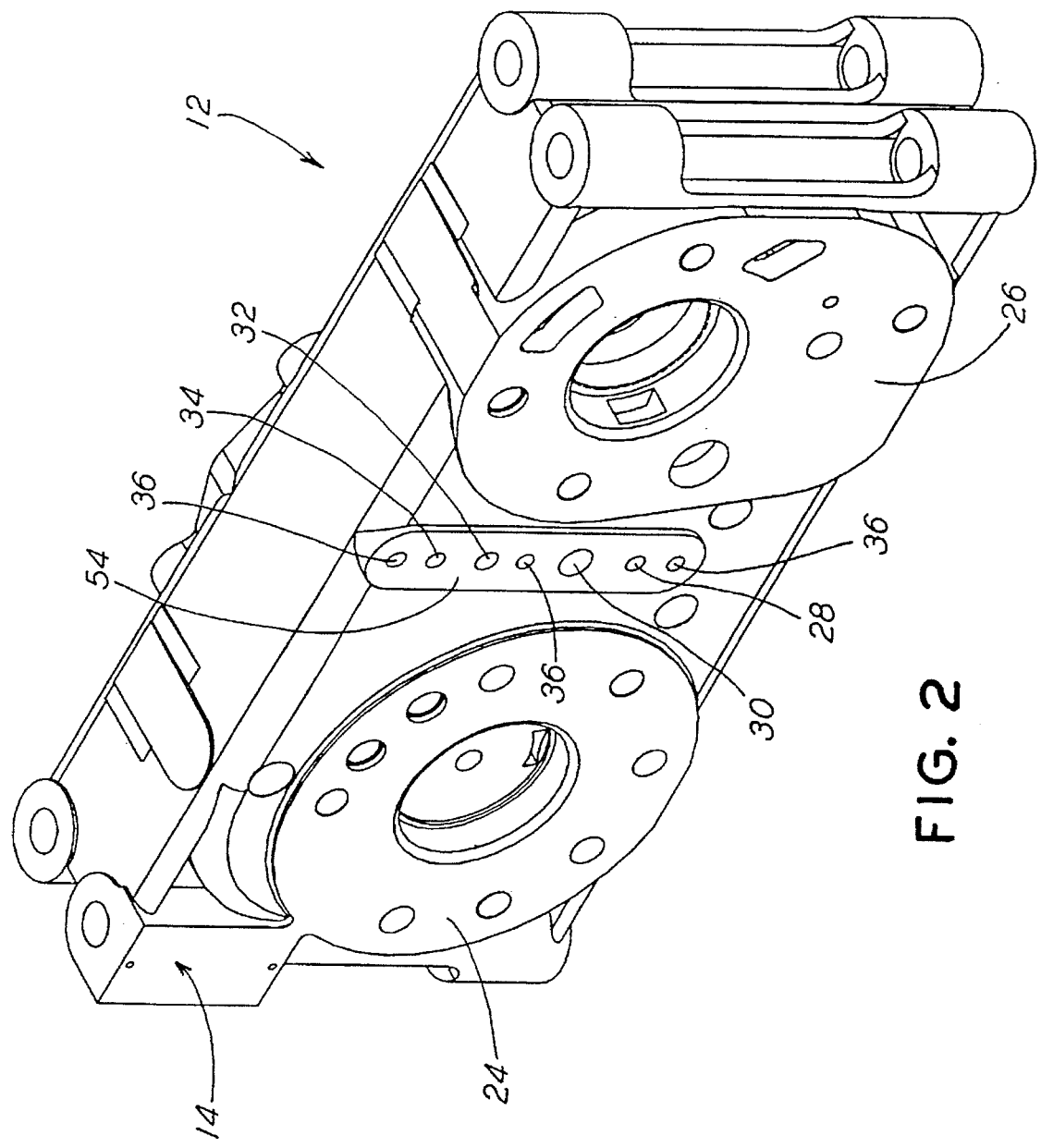
FIG. 2 is an axonometric view of the pipe bracket portion of FIG. 1, with the service and emergency valve portions removed to show a plurality of test ports via which pressurized air may be accessed for conducting a brake test.

Referring next to FIG. 2, the pipe bracket portion 12 is shown having the service portion 18 and the emergency portion 20 detached therefrom. The service portion 18 is mountable to a mounting surface 24 on the pipe bracket portion front side 14 and the emergency portion 20 is also mountable to a mounting surface 26 on the pipe bracket portion front side 14. Between the mounting surface 24 and the mounting surface 26 lies an area on pipe bracket portion front side 14 in which are located four test ports 28, 30, 32, 34. Test port 28 connects to the brake cylinder passageway, test port 30 to the brake pipe passageway, test port 32 to the auxiliary reservoir passageway and test port 34 to the emergency reservoir passageway (the passageways are not shown in FIG. 2). The test ports 28, 30, 32, 34 are located upon a mounting surface or boss 54 of the pipe bracket portion 12. The boss 54 is preferably integral with the pipe bracket portion 12 and its surface is preferably planar. Threaded screw holes 36 are also preferably provided on boss 54. Fluid pressure in each air line may be monitored by accessing the air through the test ports 28, 30, 32, 34.

Figure 3:
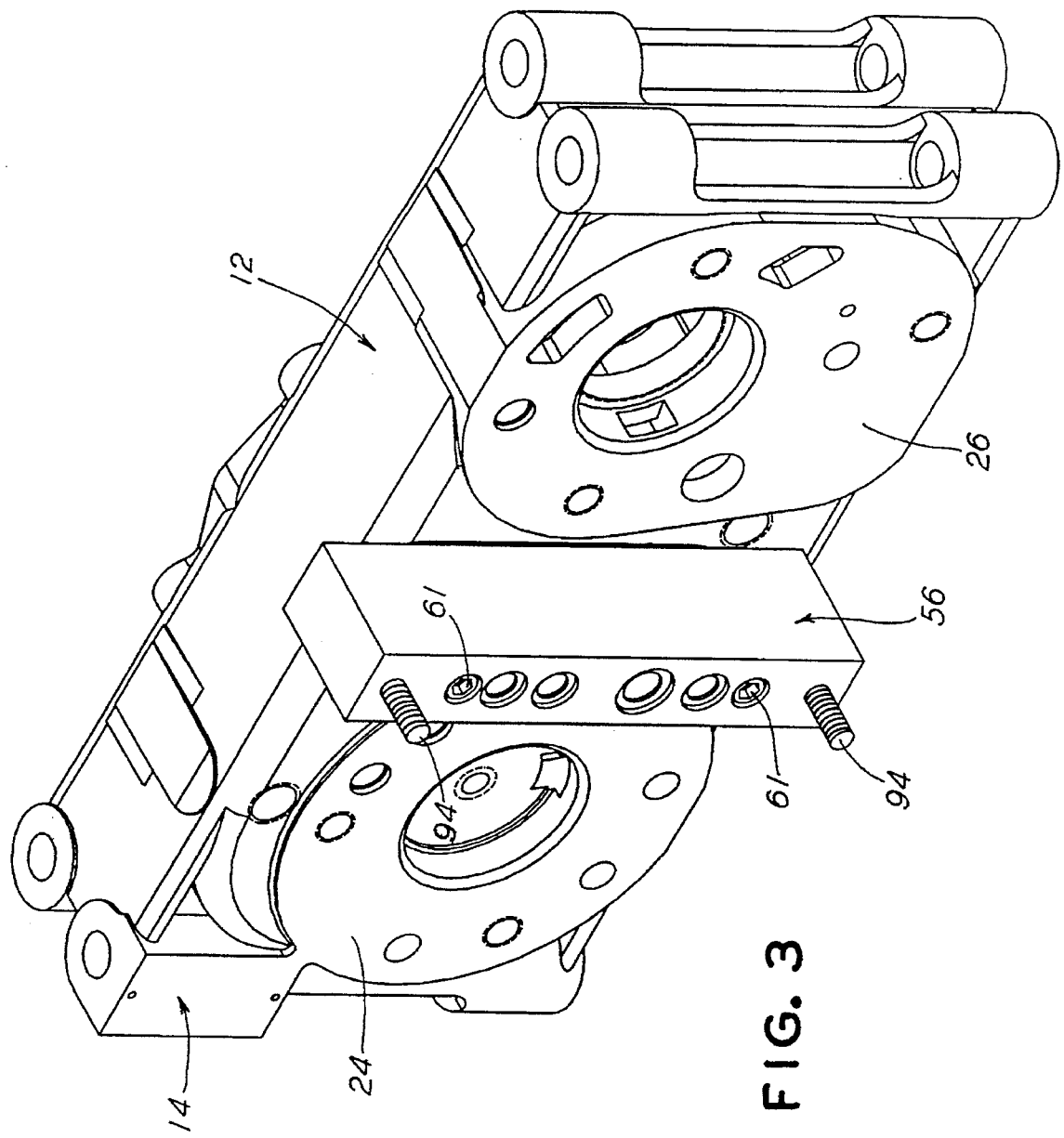
FIG. 3 is an axonometric view of the pipe bracket portion of FIG. 2 having an access housing affixed to the test port area of the pipe bracket to provide access to the test ports and to maintain closure of the test ports during normal control valve operation.

Referring next to FIG. 3, an access housing 56 is shown attached to the pipe bracket portion 12. As can be seen, the access housing 56 is mounted upon the pipe bracket portion front side 14 at boss 54. The access housing 56 may be affixed to the pipe bracket portion front side 14 by any convenient means such as by housing screws 61 that are threadedly received in holes 36. Preferably, the access housing 56 has a planar surface which mates with the planar surface of boss 54. It is further preferred that a gasket be provided between the access housing 56 and the pipe bracket portion first side 14.

Figure 5:
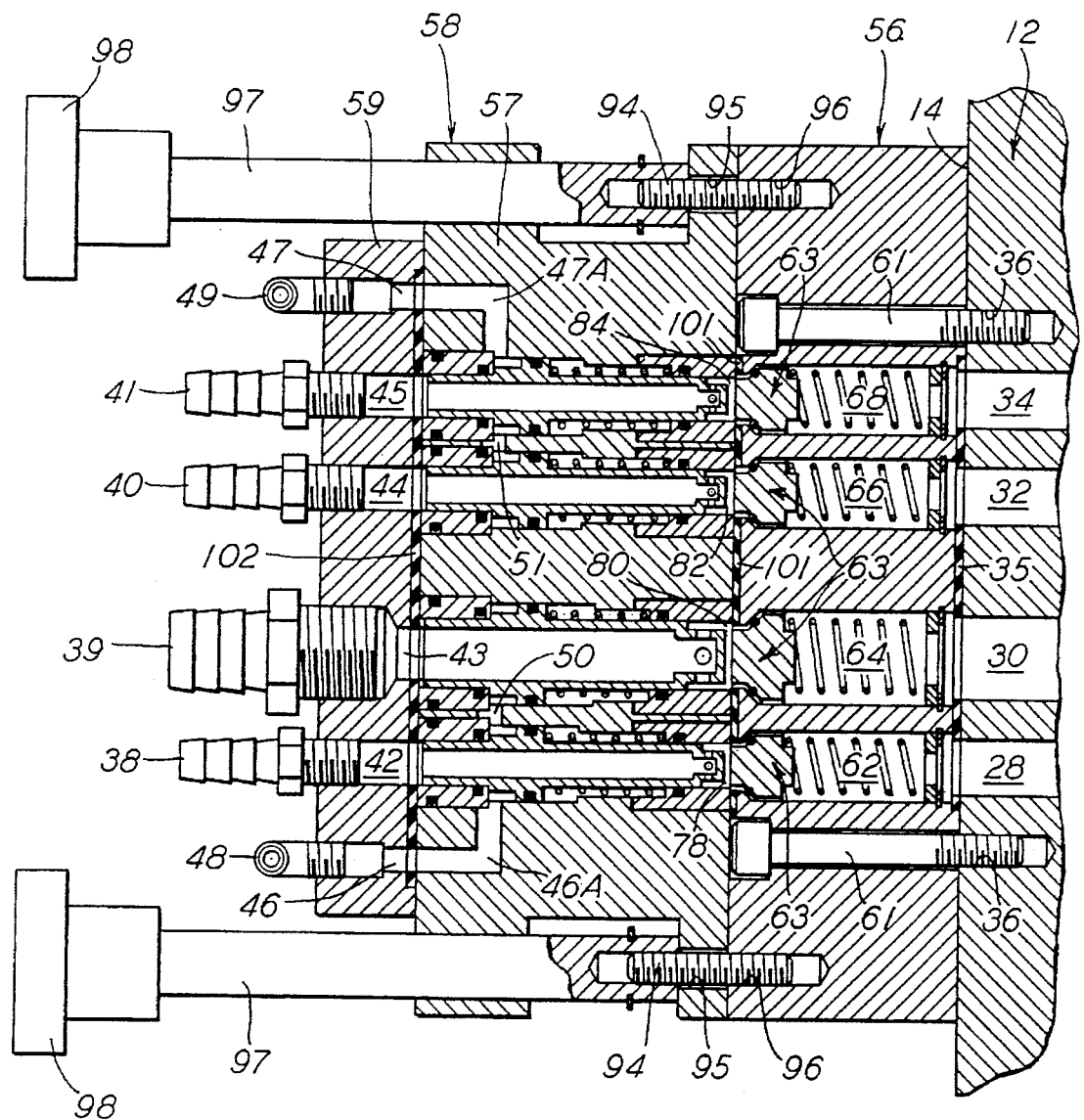
FIG. 5 is a cross-sectional view of the access housing and test connector of FIG. 4 taken along the lines 5—5 of FIG. 4.

As shown in FIG. 5, access housing 56 has channels 62, 64, 66, 68 for communicating with the respective test ports 28, 30, 32, 34. The access housing channels 62, 64, 66, 68 have opposed ends, with one end of each channel 62, 64, 66, 68 being sized and configured to connect to and sealably engage with the respective test ports 28, 30, 32, 34 through the intermediary of a gasket 35 at the pipe bracket/access housing interface. Furthermore, the housing channels 62, 64, 66, 68 are positioned in the access housing 56 such that when the access housing 56 is connected with boss 54 by screws 61, the housing channels 62, 64, 66, 68 are aligned with the respective test ports, 28, 30, 32, 34 of the pipe bracket portion front side 14.

Within each housing channel 62, 64, 66, 68, is a valve seat 74 (FIG. 7) and a corresponding check valve device 63. Each such check valve device 63 is preferably comprised of a valve element 72 with which a spring 70 is engageable and which together operate in conjunction with the valve seat 74. The valve elements 72 of these check valves 63 are each movable within their respective housing channels 62, 64, 66, 68 and are normally biased by the springs 70 into contact with the valve seats 74. With check valve elements 72 in biased contact with the respective valve seats 74, the check valves are said to be in a closed position, in which fluid at the test ports 28, 30, 32, 34 is prevented from escaping through the access housing 56.

Figure 4:
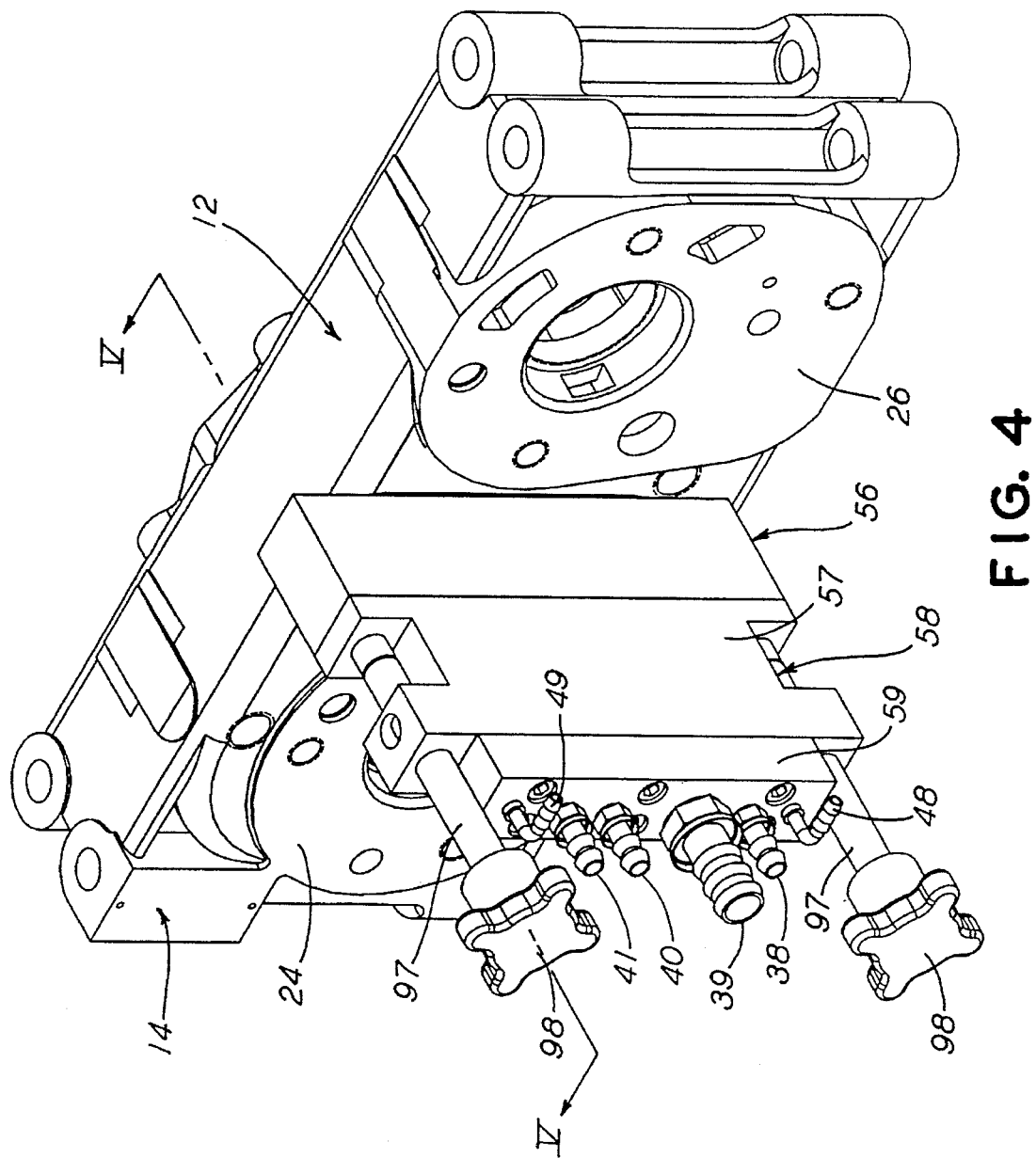
FIG. 4 is an axonometric view of the pipe bracket portion and access housing of FIG. 3 with the test connector of the present invention hooked up to the access housing preparatory to conducting a brake test.
Figure 6:
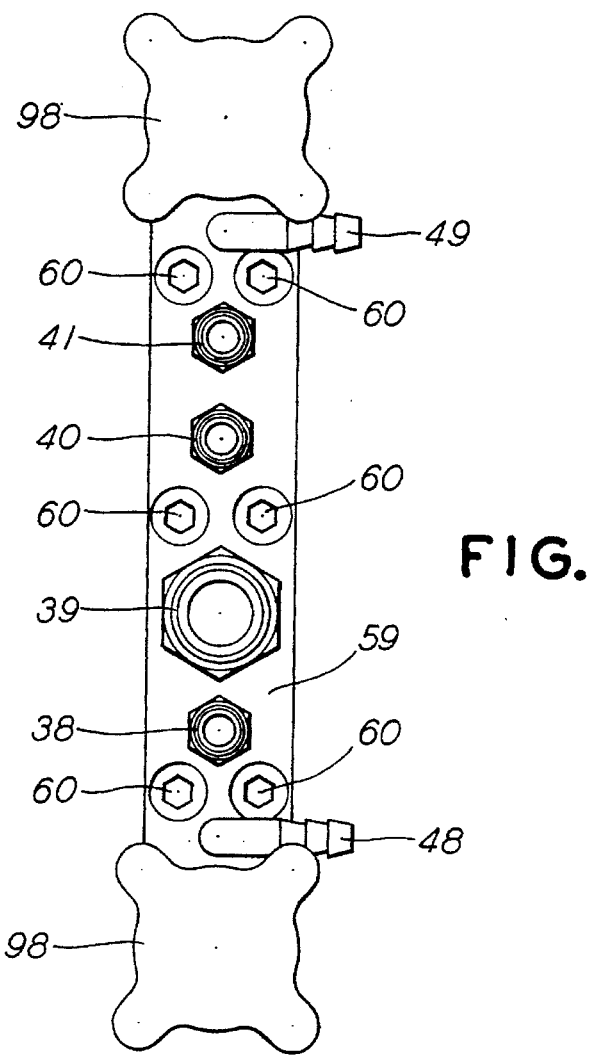
FIG. 6 is a front elevation outline view of the test connector of FIG. 4.

As can also be seen in FIGS. 4 and 5, a test connector 58 is attached to access housing 56 when it is desired to access the fluid pressures of the various test ports 28, 30, 32, 34. Test connector 58 comprises an adapter plate 57 and a connector plate 59 that are connected together by bolts 60 (FIG. 6). The test connector 58 is connected to access housing 56 by threaded studs 94 that are screwed into threaded openings 96 in access housing 56 and project therefrom via an opening 95 in adapter plate 57 to guidably receive a corresponding internally threaded extension member 97. The end opposite the internally threaded end of extension members 97 is fit with a knob 98 for manually assembling and securing test connector 58 to access housing 56 without requiring any tools.

Figure 7:
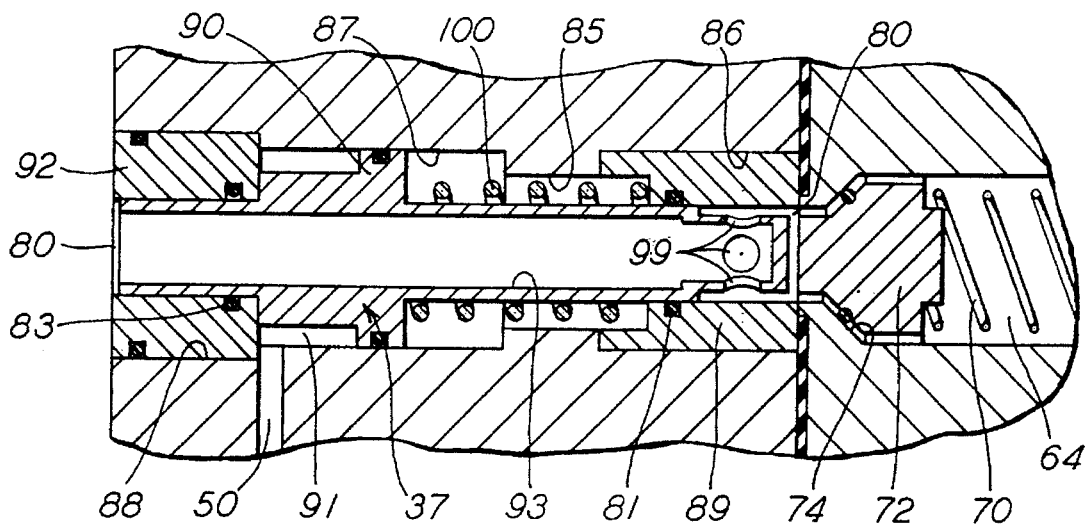
FIG. 7 is an enlarged sectional view showing one of the similar actuator/check valve arrangements of FIG. 5.

As best viewed in FIG. 7, test connector 58 has through channels 78, 80, 82, 84 formed in adapter plate 57 that are aligned with the respective access housing channels 62, 64, 66, 68 when the test connector is bolted in place on access housing 56. Adapter plate 57 houses a plurality of actuators 37, while connector plate 59 has a plurality of hose fittings 38, 39, 40 and 41 affixed in respective channels 42, 43, 44 and 45 that are aligned with channels 78, 80, 82 and 84 in adapter plate 57. A gasket 101 at the access housing/test connector interface, and another gasket 102 at the adapter plate/connector plate interface pneumatically seal the respective channels against leakage of pneumatic pressure at the interfaces.

Also provided in connector plate 59 are channels 46 and 47 in which are affixed hose fittings 48 and 49. These channels 46, 47 are aligned at the adapter plate/connector plate interface with one end of pilot channels 46A, 47A which, in turn, have their other end opening into channels 78 and 84 in adapter plate 57. Cross-channels 50, 51 in adapter plate 57 interconnect the respective channels 78, 80 and 82, 84.

Connected to the respective hose fittings 38–41, are flexible conduits such as hoses (not shown) via which compressed air may be accessed from test ports 28, 30, 32, 34 and delivered to an automatic test device, such as that shown and described in co-pending application, Ser. No. 08/396,815, which is incorporated herein by reference. Additional hoses (also not shown) associated with fittings 48, 49 are provided to connect a source of compressed air to pilot channels 46, 46A and 47, 47A from a source of compressed air such as is normally provided for the aforementioned automatic test device.

Referring now to FIG. 7, there is shown one of the plurality of actuators 37 associated with channel 80 in actuator plate 57, it being understood that the actuators 37 associated with the other channels 82, 84 and 86 are similar. Channel 80 is formed by a bore 85 having a counterbore 86 at one end and a counterbore 87 at the other end, counterbore 87 having a further counterbore 88. A spring seat 89 is pressed into counterbore 86 and is formed with a central opening in which a stem end of actuator 37 is operatively disposed. Formed integral with the actuator stem is an annular piston 90 that is guidably disposed in counterbore 87. One side of piston 90 is undercut to form a pilot chamber 91 in conjunction with counterbore 87 and with an annular retainer member 92 that is press fit into counterbore 88. Connected to pilot chamber 91 is cross channel 50 to which hose fitting 48 is connected via pilot channel 46, 46A and the pilot chamber 91 of actuator 37 associated with channel 78 in adapter plate 57 (FIG. 5). In like manner, pilot hose fitting 49 is provided to pressurize pilot chambers 91 of the respective actuators 37 associated with channels 82, 84. Alternatively, a pilot connection for each channel or one for all of the channels may be employed without departing from the scope of the invention.

Actuator 37 is further formed with a central passage 93 that is closed at its stem end adjacent check valve element 72 and open at its opposite end adjacent cover member 59. At its stem end, the periphery of actuator 37 is formed with a reduced diameter section having openings 99 via which central passage 93 is communicated with channel 80.

Seal rings 81 and 83 are provided between actuator 37 and the respective spring seat 89 and retainer member 92 to isolate piston member 90 from the test air supplied to channel 80 when check valve 63 is open. In this regard, central passage 93 is provided to conduct the test air from channel 80 upstream of seal ring 81 to channel 43 and ultimately the test device.

A spring 100 between piston 90 and seat 89 biases actuator 37 toward engagement with a stop provided by retainer member 92, which is the normal or deactivated condition of the actuator. In this position, the opposite ends of actuator 37 are slightly below the respective faces of adapter plate 57, within channel 80.

When it is desired to conduct an automatic single car brake test in accordance with the test equipment disclosed in the referenced Patent application, the test connector 58 is hooked up to access housing 56 by grasping handle knobs 98 and positioning the test connector so that extension members 97 receive threaded studs 94. In this position, the test connector channels 78, 80, 82, 84 are aligned with the corresponding access housing channels 62, 64, 66, 68 and the extension members 97 are tightened to secure the assembly. In that the end of actuator 37 adjacent check valve 63 is retracted in its de-activated state, as shown, so as to be spaced from the corresponding check valve device 63, springs 70 are effective to seat the check valves and thereby maintain closure of the test ports.

When it is desired to initiate the automatic test procedure, a solenoid valve (not shown) or other such valve preferably associated with and located at the site of the automatic test device is operated to supply compressed air from a source of supply to hose fittings 48, 49 via a flexible conduit such as hoses. The compressed air is then conducted to pilot chambers 91 of the respective actuators via pilot channels 46, 46A and 47, 47A, and cross channels 50, 51. As the pilot pressure builds up in pilot chambers 91, the resultant force on pistons 90 overcomes the opposing force of bias springs 100 to shift the actuators in a righthand direction, as viewed in the drawings. This results in the stem end of the respective actuators engaging and unseating check valve elements 72. In this manner, the compressed air effective at test ports 28, 30, 32, 34 is connected past the unseated check valves to channels 78, 80, 82, 84 in actuator plate 57 and thence via holes 99 and central passage 93 of actuators 37, and channels 42, 43, 44, 45 and hose fittings 38, 39, 40, 41 in cover member 59 to the test connector without any escape of air either during assembly of the test connector onto the access housing or thereafter. Moreover, such pilot operation of the actuators to an activated state allows an operator to control access of the test port pressure at a location remote from the test connector, and at a selected point in time that is unrelated to the hookup of the test connector to access housing 56. Consequently, a safer, as well as more reliable and accurate test operation, is accomplished.

Following completion of the test procedure, the solenoid control valves supplying pilot pressure to the test connector are operated to exhaust the pilot pressure and allow bias springs 100 to reset actuators 37 to their normal deactivated state. When this occurs, the stem ends of actuators 37 are retracted, allowing check valve springs 100 to seat check valve elements 72 on seats 74 and thereby interrupt communication between test ports 28, 30, 32, 34 and test connector channels 78, 80, 82, 84.

We claim:

1. For a railroad car control valve device having a plurality of test ports in fluid pressure communication with a respective one of a brake pipe, an auxiliary reservoir, an emergency reservoir and a brake cylinder device of said railroad car, a test connector connected to said control valve device at said test ports thereof for conducting fluid under pressure from said test ports to apparatus for testing operation of the railroad car brakes, said test ports being normally closed by check valve means, said test connector comprising:

a. a body having a plurality of channels therethrough aligned with corresponding ones of said test ports;

b. actuator means reciprocally disposed in respective ones of said plurality of channels for opening said check valve means each said actuator means comprising:
      (i) a stem having one end adjacent said check valve means;
      (ii) a piston member operatively connected to said stem and cooperatively arranged with said channel therefor to form a pilot chamber on one side of said piston member; and c. bias means acting on the other side of each said piston member for urging movement of each said actuator means in a first direction away from engagement of said one end of said stems with said check valve means; and d. means for connecting a supply of fluid under pressure to each said pilot chamber to urge each said actuator means in a direction opposite said first direction to effect engagement of said one end of said stems with said check valve means to effect opening thereof, whereby the fluid under pressure effective at said test ports is conducted to said test apparatus via said channels.

2. A test connector as recited in claim 1, wherein said body comprises:

a. an adapter plate having first and second faces and a plurality of through bores, said first face adjoining said control valve device;

b. a connector plate affixed to said adapter plate and having a through bore aligned with each said through bore in said adapter plate, said connector plate having a first face adjoining said second face of said adapter plate; and c. a plurality of hose fittings in said second face of said connector plate each communicated with a respective one of said bores therein, said bores in said adapter plate and said bores in said connector plate forming said channels of said test connector.

3. A test connector as recited in claim 2 further comprising seal means for providing a fluid pressure seal between said actuator means and said bore in said adapter plate.

4. A test connector as recited in claim 3 wherein said stem is formed with a central passage opening into said bore of said adapter plate at a location between said seal means and said first face of said adapter plate, and between said seal means and said second face of said adapter plate to provide a channel through which fluid under pressure is conducted from said test ports to said test apparatus via said bore in bypass of said seal means.

5. A test connector as recited in claim 2, wherein said bore in said adapter plate is formed with a first shoulder to provide a stop with which said actuator means is engageable in response to movement of said actuator means in said first direction.

6. A test connector as recited in claim 5, further characterized in that said one end of said stem is retracted from said first face of said adapter plate when said actuator means is engaged with said first shoulder stop.

7. A test connector as recited in claim 5, wherein said end of said stem opposite said one end is retracted from said second face of said adapter plate when said actuator means is engaged with said first shoulder stop.

8. A test connector as recited in claim 6, wherein said bias means is a spring.

9. A test connector as recited in claim 8, wherein said bore further includes a second shoulder, said spring being disposed between said other side of said piston member and said second shoulder.

10. A test connector as recited in claim 9, wherein said piston member is formed integral with said stem.

11. A test connector as recited in claim 6, wherein said bore further includes a second shoulder to provide a stop with which said other side of said piston member is engageable to limit movement of said actuator means in said opposite direction.

* * * * *